United States Patent Office 3,462,201
Patented Aug. 19, 1969

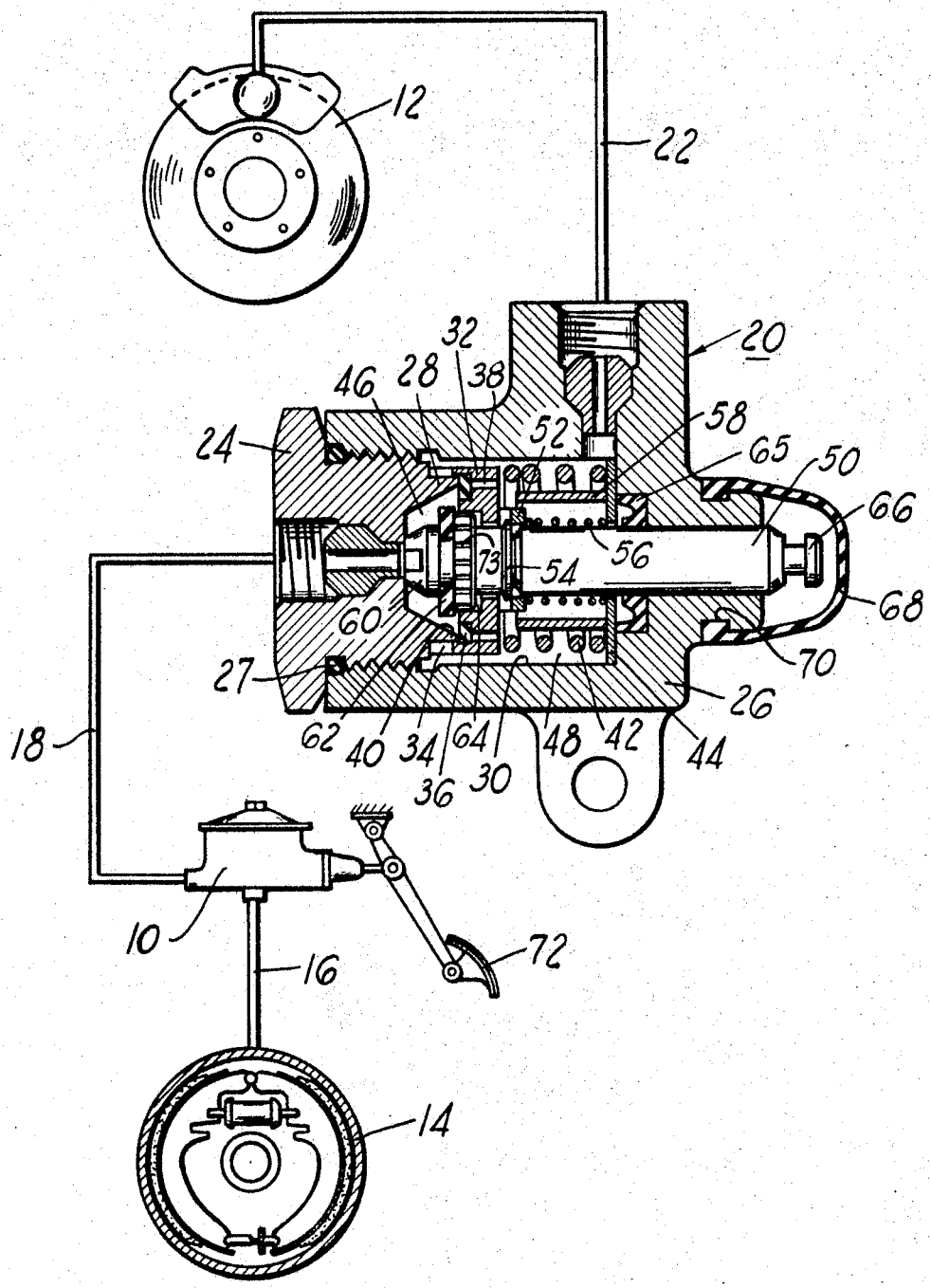

3,462,201
PRESSURE HOLD-OFF VALVE
Richard L. Lewis and Donald W. Smith, St. Joseph, Mich., assignors to The Bendix Corporation, a corporation of Delaware
Filed Apr. 13, 1967, Ser. No. 630,710
Int. Cl. B60t *13/00;* F16k *17/26, 45/00*
U.S. Cl. 303—6                     5 Claims

ABSTRACT OF THE DISCLOSURE

A fluid pressure responsive hold-off valve having a pressure responsive stem and a pressure responsive valve seat the former of which is adapted to be relatively movable with respect to the latter, which valve is adapted to control fluid pressure delivery from an actuator to a motor.

Summary

The pressure hold-off valve in accordance with my invention is especially designed for a brake system of an automotive vehicle which includes a pair of front disc brake assemblies and a pair of rear drum brake assemblies. In such a brake system, as may be readily realized by those skilled in the art to which my invention relates, the actuation pressure required for actuation of the disc brake assemblies is substantially less than that required for actuation of the drum brake assemblies. This is due primarily to the return springs interconnecting the shoes of the drum brakes which must be overcome during an initial brake application. Therefore, only slight pressure is required to apply the disc brake while a sizeable pressure is required to overcome the return springs on the drum brakes before the brake shoes engage the brake drums.

It is therefore an object of this invention to provide a brake system with a pressure hold-off valve capable of communicating a limited pressure to the disc brakes at first and thereafter terminate the delivery of fluid pressure to the disc brakes until a predetermined pressure realized whereupon the value will control fluid communication to the disc brakes.

It is a further object of this invention to provide a pressure hold-off valve which will, after the predetermined pressure is reached to activate the drum brakes, as aforementioned, reopen fluid pressure to the front disc brakes.

It is still another object of the pressure hold-off valve of this invention to maintain open communication between the fluid pressure motor and the pressure generating source to permit handling of flow of fluid caused by thermal contraction thereby preventing the creation of a vacuum in the fluid system.

Drawing description

The sole figure of the drawing is a schematic view of a brake system with a cross sectional view of a hold-off valve in accordance with the principles of my invention installed between a manually operated master cylinder and the vehicle disc brakes.

Detailed description

Referring now to this figure a dual master cylinder 10 is provided for actuating a pair of front disc brakes (one of which is shown, as at 12) and a pair of rear brakes (one of which is shown, as at 14). A conduit 16 connects one actuating chamber of the dual master cylinder with the wheel cylinders of the rear brakes, and a conduit 18 connects the other actuating chamber of the dual master cylinder with a pressure hold-off valve 20 which in turn is connected by a conduit 22 to the actuating cylinder of the front disc brakes 12.

An inlet fitting 24 is threadedly secured at one end of a valve housing 26 with a seal 27 compressed therebetween. The fitting 24 has a tubular projection 28 extending into a bore 30 of the housing 26. An annular valve poppet 32 having a forwardly projecting sleeve 34 is slidably placed over the projection 28. This sleeve 34 is provided with radially spaced openings adjacent its terminal edges, and a ring 36 is held within a recess of the poppet 32 to overlie a series of openings 38 through the poppet 32 to terminate behind the ring 36. The tubular portion 28 of the fitting 24 is formed with a valve seat 40 to normally abut on the ring 36 due to the action of spring 42 that is compressed between the poppet 32 and a spring bearing plate 44 located at the end of the bore 30. Thus, an inlet chamber 46 and an outlet chamber 48 are provided within the housing 26. A valve stem 50 is slidably guided by the housing 26 and fits through the annular poppet 32. A spring retaining ring 52 fits over a flange 54 of the stem 50 and is normally held to abut a rear face of the poppet 32 by a spring 56 between the ring 52 and the spring bearing plate 44 within a sleeve 58. The valve stem 50 is provided with a head 60 that, due to the action of the spring 56, abuts the plug 24 so that a ring 62 carried immediately behind the head 60 by the stem 50 is spaced from the annular poppet 32 on which the ring 62 seats. It should be noted that the valve stem 50 and the annular poppet 32 are sized to provide a passageway 64 between the poppet and the stem which is open whenever the ring 62 is held in the attitude shown by the drawing.

A seal 65 is provided at the right end of the bore 30 about the stem 50 in order to seal the outlet chamber 48. Furthermore, the stem 50 is provided with a button 66 on that portion which extends beyond the housing 26, and a boot 68 is snap fitted to a recess 70 in the housing 26 over the projection of the stem 50 therethrough to prevent contaminants from corroding the sliding relationship of the stem 50 and the housing 26, as well as from entering to destroy the seal 65 or contaminate the outlet chamber 48.

Operation

In operation, an operator depresses pedal 72 and a pressure is developed in the master cylinder 10. This pressure will be delivered via conduits 16 and 18 to the wheel brakes 14 and the hold-off valve 20, respectively.

At first, the fluid under pressure to the valve 20, will, because of the open attitude of the ring 62 and the passage 64, flow from the inlet chamber 46 around ring 62 through passage 64 to the outlet chamber 48 and to the actuators for the disc brakes 12. As pressure develops within the outlet chamber 48, it acts upon the valve stem 50 to compress the spring 56 and draw the ring 62 against poppet 32 over the passages 64 to terminate the communication of the inlet chamber 46 and the outlet chamber 48 whereby further braking pressure to the disc brakes 12 is held off.

At this point of time the pressure from the conduit 18 of the master cylinder 10 is now effective in the inlet chamber 46 over the combined area of the valve stem and the valve poppet within the valve seat area 40 to be effective to further move stem 50 deforming ring 62 somewhat and increasing pressure in chamber 48 in that the area of stem 50 behind ring 62 is greater than the area of the stem being forced from chamber 48. Thereafter, inlet pressure upon bottoming of the stem 50 on poppet 32 will try and compress the spring 42. Depending upon the force of the spring 42, the poppet 32 and the stem 50 are moved upon a predetermined pressure to remove the ring 36 from the seat 40 whereby pressure is again directed from the inlet chamber 46 about the poppet 32 to the outlet chamber 48 and consequently to the disc brakes 12.

With a valve in accordance with the tenets of this invention a much greater flow is permitted through the valve at the initial stages of operation prior to the closing of the valve. Furthermore, this novel manner of providing an increased passage area will allow a much higher thermal contraction flow through the valve from the inlet port to the outlet port, while retaining the desirable shut-off characteristic in the valve in that the stem will move at a pressure less than 20 p.s.i. down to a position against the poppet whereby the smaller diameter seal, the ring 62, will rest against the piston or poppet 32 and shut off the flow through the valve.

It should also be noted that upon the release of the brake pressure, the flow will return backwards through the valve passing through slots 73 in the rim of the stem which may be utilized to maintain the proper relationship and the desirable area for the passage 64. This pressure will raise the ring 62 away from the poppet 32 and allow fluid to flow around the ring 62 and out through the inlet port.

Having fully described an operative construction of our invention, it is now desired to set forth the intended protection in the form of the following claims.

We claim:
1. A fluid pressure regulating valve comprising:
    a housing having an inlet port and an outlet port with a chamber therebetween;
    valve means in said chamber between said inlet port and said outlet port and operative with a valve seat about said inlet port to control fluid flow in accordance with fluid pressure, said valve means including:
        an annular poppet in said chamber biased normally onto said valve seat,
    said annular poppet having a resilient ring in a cavity on the side of said poppet facing said valve seat, said cavity being opened to the other side of said poppet;
    a spring biased valve stem slidably associated with said housing, said stem passing through said poppet and movable relative thereto, said stem and said poppet being sized to prescribe a fluid passage therebetween; and
    a valve ring operatively connected to said stem on the inlet side of said housing and normally spaced from said passage.

2. A pressure regulating valve according to claim 1 and further comprising a stop sleeve operatively connected to said housing to limit travel of said spring biased annular poppet.

3. A pressure regulating valve according to claim 1 wherein said annular poppet has a stepped opening therethrough and said stem has a stepped up flange behind said valve ring to permit limited pressure increase from said valve during the time said valve ring is closing said passage and said poppet is maintained on said valve seat.

4. A pressure regulating valve according to claim 3 wherein said annular poppet includes a resilient ring in a cavity on the side of said poppet facing said valve seat, said cavity being opened to the other side of said poppet.

5. A fluid pressure regulating valve according to claim 4 wherein the spring biasing said stem is concentric with a spring that biases said poppet and of substantially lighter force.

References Cited

UNITED STATES PATENTS

| | | |
|---|---|---|
| 3,354,638 | 11/1967 | Kersting. |
| 3,358,445 | 12/1967 | Wallace. |
| 3,375,852 | 4/1968 | Milster. |
| 3,385,637 | 5/1968 | Kersting. |
| 3,394,546 | 7/1968 | Stelzer. |

M. CARY NELSON, Primary Examiner

ROBERT J. MILLER, Assistant Examiner

U.S. Cl. X.R.

137—493.6